May 28, 1929.  W. E. SLOAN  1,714,573
VALVE
Filed Feb. 12, 1923  2 Sheets-Sheet 1
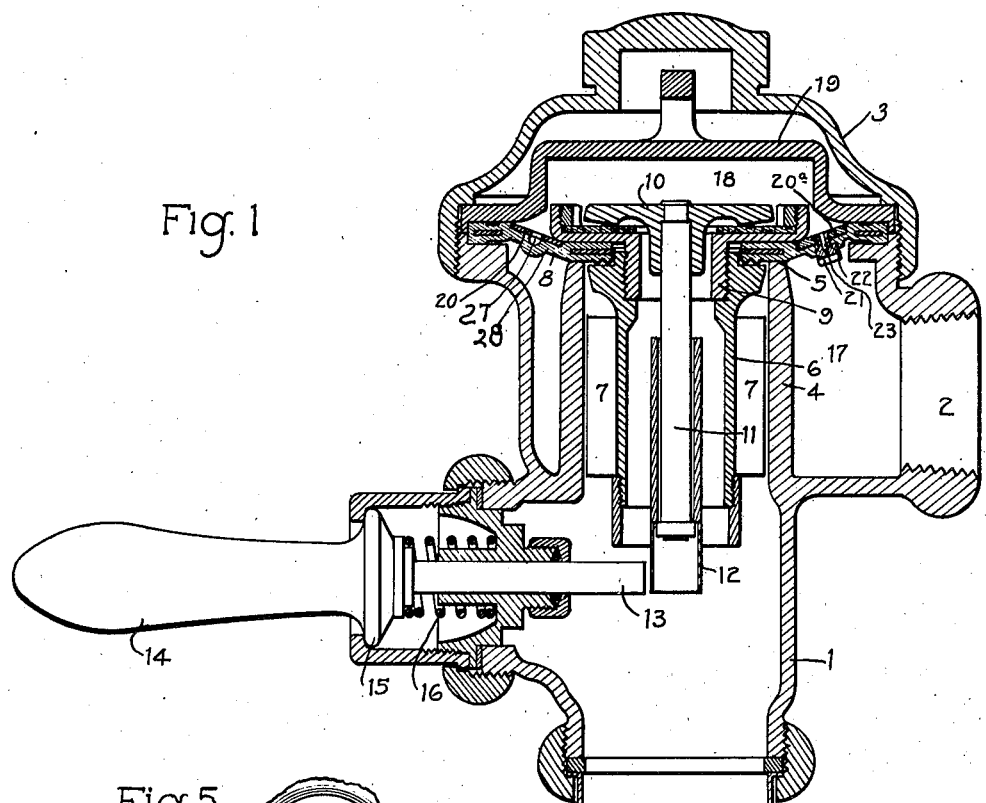
Fig. 1
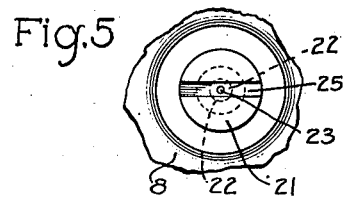
Fig. 5
Fig. 4
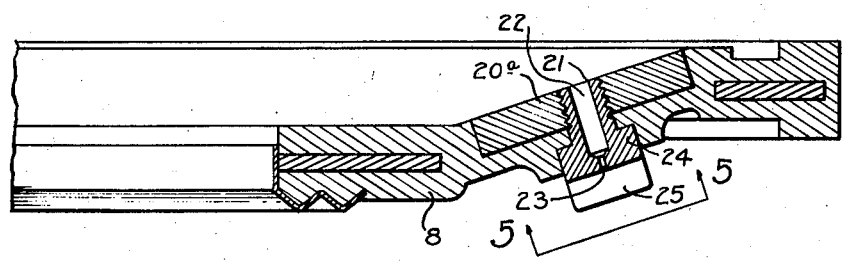
Inventor:
William E. Sloan
By Parker Carter Attys

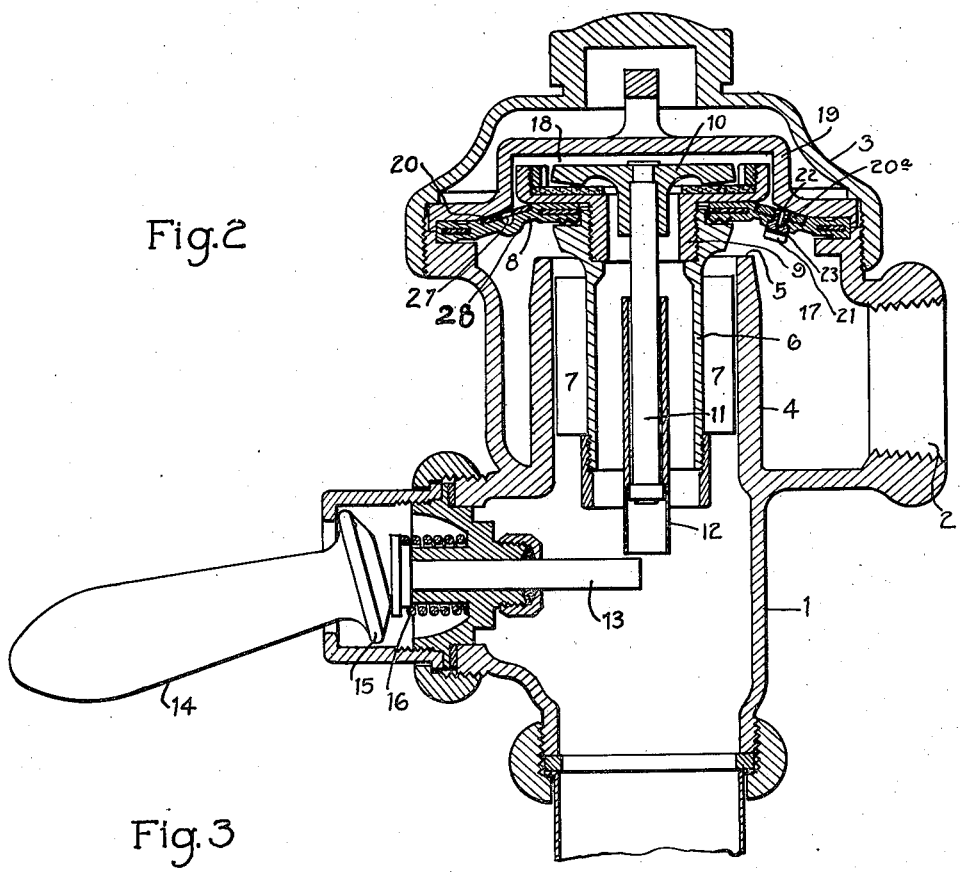
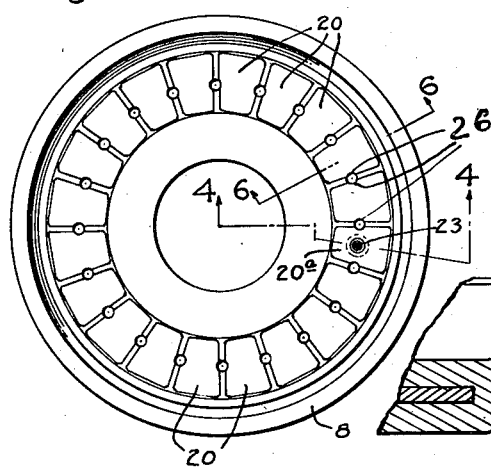
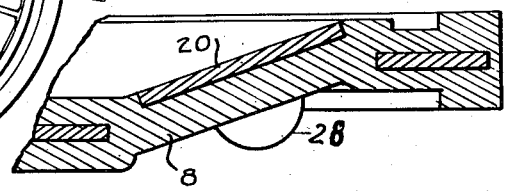

Patented May 28, 1929.

1,714,573

UNITED STATES PATENT OFFICE.

WILLIAM E. SLOAN, OF CHICAGO, ILLINOIS.

VALVE.

Application filed February 12, 1923. Serial No. 618,434.

This invention relates to valves and has for its object to provide a new and improved valve of the diaphragm type particularly adapted to be used as a flush valve. The invention has among other objects to provide a construction by means of which the diaphragm is stiffened without interfering with its proper working; a construction which will prevent vibration when the valve closes and thus do away with the knocking and noise due to such vibration; to provide a diaphragm through which a by-pass may be easily and quickly made and to simplify and cheapen the construction and the assembling of the valve. The invention has other objects which are more particularly set out in the following description.

Referring now to the drawings:

Fig. 1 is a sectional view showing one form of valve embodying the invention, the valve being closed.

Fig. 2 is a view similar to Fig. 1 showing the valve open.

Fig. 3 is a plan view showing one form of diaphragm.

Fig. 4 is an enlarged sectional view taken on line 4—4 of Fig. 3.

Fig. 5 is an enlarged plan view of the bottom of the by-pass.

Fig. 6 is an enlarged sectional view taken on line 6—6 of Fig. 3.

Like numerals refer to like parts throughout the several figures.

For purposes of explanation, I have illustrated the invention in connection with a particularly constructed flush valve which illustrates a large number of its advantages. In this construction, there is a casing 1 having an inlet 2 and a cover 3 which is preferably screwed on to the casing. Within the casing is a valve supporting part 4 having in its upper end a seat 5 for the main valve. This main valve consists of a part 6 which projects into the part 4 and which has guiding wings 7 located at intervals thereabout, there being preferably four wings on the part 6. These wings slide up and down within the part 4 and guide the valve disc to the seat. The part 6 is connected with the flexible diaphragm 8. Connected with the part 5 is a metallic valve piece 9 which is screwed into the part 6, the inner edge of the diaphragm being clamped between the parts 9 and 6, as clearly shown in Fig. 1. In the particular construction shown there is an auxiliary valve 10 which rests upon the part 9 and which has a stem 11 which projects down through the part 9 and has the sliding sleeve 12 on the stem which is engaged by the actuating part 13 which pushes laterally to tilt and thus open the auxiliary valve.

The actuating part 13 is actuated by the handle 14 which has an enlarged end 15 which engages the end of the actuating part when the handle is moved in any direction and forces it inwardly. The actuating part 13 is retracted by the spring 16. Any other construction than that shown herein for actuating the main valve may of course be used.

It will be noted that the diaphragm divides the valve casing into two chambers, the lower chamber 17, and the upper chamber 18, and some means must be provided for connecting the two chambers together to equalize the pressures or the main valve will be held open. This necessitates a passageway which heretofore had to be made in the casing because such passageway could not be made through the ordinary rubber diaphragm heretofore used so as to be practical and commercial. The result was that an opening had to be made in the casing 1 and then an opening had to be made through the cap 19. A hole also had to be made through the diaphragm at the point where it is clamped between the casing 1 and the cap 19 and in assembling these parts they had to be arranged so that all three of these openings registered. This made it necessary to have dowel pins in one of the parts and openings in the other parts and the parts had to be accurately assembled to secure the registration of these holes. By means of the present invention these difficulties are obviated and the equalizing opening may be made directly through the diaphragm as hereinafter described. In constructing the present diaphragm which is preferably of rubber, I provide a series of sections 20 of rigid material, preferably metal. These sections are attached to the diaphragm in any desired manner so as to form a part thereof. The sections are separated, as shown, so as to give the proper flexibility to the diaphragm and they are of such length as to engage at their ends two rigid portions of the valve, one stationary and the other movable, so that the diaphragm will be kept from bending. These sections 20 do not extend entirely across the diaphragm but are of such length as to leave flexible portions at each end thereof, between the sections and the parts between which the outer and inner edges of the diaphragm are clamped. These flexible parts constitute the bending parts of the diaphragm which permit it to be moved back and forth. In the construction shown, the sections are held by the metal piece or cap 19 in the valve and at the other end are held by the part 9, being the movable part. It will thus be seen that the ends of these sections are held by rigid parts of the valve so as to prevent the buckling or bending of the diaphragm due to the pressure of the water and yet there is no interference with the flexibility of the diaphragm at the bending parts thereof. By having these rigid sections connected to the diaphragm, I can make the opening through the diaphragm which is utilized to equalize the pressure in the two chambers of the valve. This construction is clearly shown in Fig. 4. For this purpose I prefer to make one of the rigid sections 20ª thicker than the remaining sections. An opening is made in this section, preferably screw threaded. There is also an opening made in the remaining portion of the diaphragm, and a by-pass tube 21 made of rigid material is inserted in this opening. This by-pass tube is shown in the form of a screw and is provided with an enlarged opening 22 at the top and a small opening 23 at the bottom. The by-pass tube 21 is provided with an annular shoulder 24 and a portion of the diaphragm is clamped between this annular shoulder and the section 20ª when the by-pass tube 21 is screwed into place so as to make a water-tight joint around the by-pass tube. The by-pass tube is provided with a groove 25 for a screw driver.

The by-pass tube has its lower end in the chamber 17 where there is sufficient room for it and where it will be washed by the flowing water so as to keep it clear from sediment or other obstructing matter. The sections 20 are attached to the diaphragm in any desired manner and are preferably molded in said rubber diaphragm and vulcanized thereto. When the sections 20 are placed in the diaphragm while it is being molded some means should be provided for preventing movement or creeping of these sections. One way of doing this is to provide the sections at their adjacent edges with notches 26. One section of the mold is provided with pins which fit into these notches so that while the diaphragm is being molded the sections 20 will be held against movement. When this method is used there are recesses 27 in the diaphragm (see Figs. 1 and 2) and in order that the diaphragm may not be weakened it is made of the proper thickness at these points, thus forming projections 28. These pins of course are removed by the removal of the mold as they are preferably fastened to it.

With a disc valve of this type it is necessary that the valve disc be guided to its seat by some suitable guiding device such as the part 6 and the wing 7. With the ordinary diaphragm there is a stretch in the rubber when the valve goes up due to the pressure of the water and on account of this stretch and the flexibility of the ordinary rubber diaphragm it has been necessary to make this guiding device fit very accurately, for otherwise the valve will not seat properly and there will be an objectionable noise and rattle. This close fitting guide is expensive to make and where the water has sediment this sediment or sand will often get in between the guiding device and the cylinder so as to bind and prevent the valve from working properly. Chemicals also affect the guide and sometimes eat the material away, and when this is done the valve will not work properly because there will be noise and rattling. Such chemicals may also, due to evaporation, deposit on the guiding device or cooperating surface and cause binding. By means of the present construction where the diaphragm has the plates connected therewith, these plates act as a bridge between the two rigid parts of the valve and prevent stretching and bending of the diaphragm at this point, and this makes it unnecessary to have an accurately fitting guide, thus reducing the expense of making an accurately fitting guide and obviating the danger of spoilage or rejection of these parts because of inaccuracy and thereby making the manufacture of the parts easier and cheaper. This construction also strengthens the weak point or wearing point of the diaphragm as the sections take this wear and cause it to last longer and to work properly under all the varying conditions found in practice.

I claim:

1. A valve comprising a casing having a passageway therethrough, a flexible diaphragm extending thereacross and dividing the casing into two chambers, said diaphragm controlling said passageway, a series of rigid sections connected with said diaphragm but separate from each other, and separated rigid parts engaged by said rigid sections, the rigid sections extending only part way across the diaphragm there being flexible parts between the ends of said sections, and the inner and outer points of attachment of the diaphragm.

2. A valve comprising a casing having a passageway therethrough, a flexible diaphragm extending thereacross and dividing the casing into two chambers, said diaphragm controlling said passageway, a series of rigid sections connected with said diaphragm but separate from each other, and separated rigid parts engaged by said rigid sections, one movable with the diaphragm, the other stationary, said rigid sections being moved toward and away from said stationary part, said diaphragm provided with flexible parts between the ends of said rigid sections, and the outer and inner points of attachment of the diaphragm.

3. A valve comprising a casing having a passageway therethrough, a flexible diaphragm extending thereacross and dividing the casing into two chambers, said diaphragm controlling said passageway, a series of rigid sections connected with said diaphragm but separate from each other, and separated rigid parts engaged by said rigid sections, said rigid sections provided with notches at their adjacent edges, said diaphragm provided with a normally open passageway by means of which the pressures in the two chambers are equalized.

4. A valve comprising a casing having a passageway therethrough, a flexible diaphragm extending thereacross and dividing the casing into two chambers, said diaphragm controlling said passageway, a series of rigid sections connected with said diaphragm but separate from each other, and separated rigid parts engaged by said rigid sections, a by-pass tube extending through said diaphragm and connected with one of said rigid sections.

5. A valve comprising a casing having a passageway therethrough, a flexible diaphragm extending thereacross and dividing the casing into two chambers, said diaphragm controlling said passageway, a series of rigid sections connected with said diaphragm but separate from each other, and separated rigid parts engaged by said rigid sections, a by-pass tube extending through said diaphragm and threaded into an opening in one of said sections, said by-pass tube having a shoulder by means of which a portion of the diaphragm is compressed against the section to form a tight joint.

6. A valve comprising a casing having a passageway therethrough, a diaphragm extending across the casing and controlling said passageway, said diaphragm formed of flexible non-metallic material, a hollow cylinder in said casing open at its upper end and through which the water passes when the diaphragm is in its upper position, a cylindrical part connected with said diaphragm and projecting into said cylinder, guides on said cylindrical part which engage the inner face of said cylinder, the passage through the cylinder being formed between its inner face and the outer face of the cylindrical part, and means for preventing vibration of the cylindrical part and guides due to the water passing through said cylinder when the valve is open whereby rattling of the parts is prevented.

7. A valve comprising a casing having a passageway therethrough, a diaphragm extending across the casing, a valve member connected with the middle of said diaphragm, the outer edge of said diaphragm being connected with said casing, a cylindrical part connected with said valve member a cylinder on the interior of the casing into which said cylindrical part projects, and means for preventing rapid lateral movement of the free end of said cylindrical part when the water is passing through said cylinder so as to prevent rattling of the parts.

Signed at Chicago, county of Cook and State of Illinois, this 28th day of January, 1923.

WILLIAM E. SLOAN.